United States Patent [19]
Tawil et al.

[11] Patent Number: 5,508,523
[45] Date of Patent: Apr. 16, 1996

[54] TRAINED DOSIMETERS, METHOD AND APPARATUS

[75] Inventors: Riad A. Tawil, Kirtland; Philip M. Pontikos, Warren; Kenneth J. Velbeck, Sagamore Hills; Joseph E. Rotunda, Cuyahoga Falls, all of Ohio

[73] Assignee: Saint Gobain/Norton Industrial Ceramics Corp., Worcester, Mass.

[21] Appl. No.: 243,863

[22] Filed: May 17, 1994

[51] Int. Cl.⁶ .................................................. G01T 1/11
[52] U.S. Cl. ............................... 250/337; 250/484.3
[58] Field of Search ............................... 250/337, 484.3

[56] References Cited

PUBLICATIONS

McKinlay, "Thermoluminescence Dosimetry" Adam Hilger Ltd., p. 135 (1981).
Harshaw/Bicron 5500–O–U–0793–003 Model 550 Automatic TLD Reader User's Manual, Section 4.0, pp. 4–1 to 4–14 (Jul. 1993).
J. H. Elliott, "Using Radiation Damage to Obtain A Large Quantity of Matched–Sensitivity Thermoluminescent Dosimeters", Health Physics, vol. 48, No. 3, pp. 309–314 (Mar. 1995).
Lau et al., "Large Enhancement of TLD–100 Sensitivity By Irradiation In A Reactor Core", Nuclear Instruments And Methods In Physics Research (1986).
Lakshmanan et al., "Comments On Large Enhancement Of TLD–100 Sensitivity By Irradiation In A Reactor Core", Nuclear Instruments And Methods in Physics Research (1987).
Folkard et al., "Sensitivity Enhancement Effects In The Themoluminescence Of LiF TLD–100 At Radiation Doses Below 10 Gy", Phys. Med. Biol. vol. 32, No. 6, pp. 769–773, (1987).
Horowitz, "The Annealing Characteristics Of LiF:MgTi", Radiation Protection Dosimetry, vol. 30, No. 4, pp. 219–230 (1990).
Masterson et al., "Pretransfusion Blood Irradiation: Clinical Rationale And Dosimetric Considerations," Med. Phys. 19(3) May/Jun. 1992.
Kron et al., "X–Ray Surface Dose Measurements Using TLD Extrapolation," Med. Phys. 20(3) May/Jun. 1993.
Toivonen, "Improving The Accuracy Of TLD Systems In Clinical Applications," Radiation/Protection Dosimetry, vol. 47 No. 1/4 pp. 497–503 (1993).

*Primary Examiner*—Davis L. Willis
*Assistant Examiner*—Richard Hanig
*Attorney, Agent, or Firm*—Volker R. Ulbrich; Don Bulson

[57] ABSTRACT

A dosimeter product that simplifies the process of dosimetry in medical diagnosis, therapy and other fields where high precision is needed. The dosimeter product is obtained by a unique training method which stabilizes the sensitivity of the dosimeter. Stability in sensitivity is established by a combination of high temperature cyclical annealing and low temperature furnace annealing. After the sensitivity of the dosimeters is stabilized, the dosimeters are then calibrated by generating for every dosimeter within a group element correction coefficients (ECCs) that compensate for the differences in sensitivity among the group of the dosimeters, bringing the sensitivity of each dosimeter to the sensitivity of the mean of the population. The result is a group of precalibrated dosimeters with stable sensitivity that are ready to use with established correction factors for individual TL response differences. This eliminates, among other things, the need for the end user to track individual dosimeters and to maintain annealing furnaces and fixtures. The dosimeters may be used to perform radiation dosimetry wherein the dosimeters are exposed to radiation after which the TL response of the dosimeter is read out. Accordingly, there is provided a dosimetry system comprising a dosimeter produced in accordance with the invention and a TLD reader for reading the TL response of the dosimeter. Also provided are an annealing tray and holder assembly useful in carrying out the method of the invention, a quench block and a storage case.

22 Claims, 3 Drawing Sheets

TRAINED DOSIMETERS, METHOD AND APPARATUS

The invention herein disclosed relates generally to thermoluminescence dosimetry and, more particularly, to dosimeters with stable sensitivity and methods and apparatus for training, handling and using the dosimeters.

BACKGROUND

Thermoluminescence dosimetry (TLD) is a technique for radiation dose measurement. Thermoluminescence is an emission of light which occurs when a thermoluminescent phosphor such as lithium fluoride (LiF) is heated after having been exposed to radiation such as beta, gamma, x-ray or neutron radiation. TLD is widely used in the fields of radiation protection, environmental radiation monitoring and a variety of medical applications.

Many medical diagnostic and therapy applications require high accuracy in measurement of radiation dose. Various techniques heretofore have been proposed for attaining the requisite sensitivity using TLD, including prestabilization of the dosimeters prior to exposure and algorithmic correction of the dosimeter response. Unfortunately, presently known prior art techniques have associated therewith one or more drawbacks including, among others, relatively tedious and time consuming dosimeter pre-stabilization procedures, relatively inflexible dosimeter handling and treatment procedures, relatively complex algorithmic correction schemes, etc.

SUMMARY OF THE INVENTION

The present invention provides a new dosimeter product that simplifies the process of dosimetry in medical diagnosis, therapy and other fields where predictability or high precision is needed. The dosimeter product is obtained by a unique training method which stabilizes the sensitivity of the dosimeter. Stability in sensitivity is established by a combination of high temperature cyclical annealing and low temperature furnace annealing. After the sensitivity of the dosimeters is stabilized, the dosimeters are then calibrated by generating for every dosimeter within a group element correction coefficients (ECCs) that compensate for the differences in sensitivity among the group of the dosimeters, bringing the sensitivity of each dosimeter to the sensitivity of the mean of the population. The result is a group of pre-calibrated dosimeters with stable sensitivity that are ready to use with established correction factors for individual TL response differences. This eliminates, among other things, the need for the end user to track individual dosimeters and to maintain annealing furnaces and fixtures.

According to one aspect of the invention, a method of stabilizing the sensitivity of a thermoluminescent dosimeter is characterized by the step of cyclically annealing the dosimeter by repeatedly annealing the dosimeter for N cycles, while allowing the dosimeter to cool after each anneal and without any irradiation of the dosimeter between anneal cycles, thereby to stabilize the sensitivity of the dosimeter. Each anneal cycle preferably includes heating the dosimeter to an upper temperature, after which heating stops and the dosimeter is allowed to cool to a lower temperature before the next anneal cycle starts. Further in accordance with a preferred embodiment, the method further includes the step of normalizing the sensitivity of the dosimeter by annealing the dosimeter for a period of time greater than the period of the cyclical anneal cycles. In the normalizing step the dosimeter preferably is annealed at a constant temperature of at least about 200° C. for a period of at least about 1 hour, and more preferably at a constant temperature of about 400° C. ±25° C. for a period of at least about 1 hour. The normalizing step also preferably includes quenching the dosimeter to a temperature no greater than 150° C.

The preferred method further includes the steps of low temperature annealing the dosimeter at a temperature in the range of 50° C. to 150° C. after the cyclically annealing step, and calibrating a group of the dosimeters after the low temperature annealing step and generating element correction coefficients for the dosimeters in the group thereof. The result is a group of precalibrated high precision dosimeters that is ready for use in radiation exposure monitoring.

According to another aspect of the invention, a method of producing a thermoluminescent dosimeter having high sensitivity stability and low fade comprises the steps of (a) training the dosimeter to stabilize the sensitivity of the dosimeter, and (b) then annealing the dosimeter at a temperature in the range of 50° C. to 150° C. for a period of at least about 2 hours. Preferably step (a) includes repeatedly annealing the dosimeter for N cycles having a period less than the anneal period of step (b), while allowing the dosimeter to cool after each anneal and without any irradiation of the dosimeter between anneal cycles, thereby to stabilize the sensitivity of the dosimeter. Step (b) is followed by the step of (c) calibrating a group of the dosimeters after step (b) and generating element correction coefficients for the dosimeters in the group thereof.

The invention also provides an annealing tray and holder assembly useful in carrying out the method of the invention. The assembly comprises an annealing tray having a base with a face containing a plurality of pockets for containing a dosimeter, and a holder. The holder includes a base having a face containing a plurality of pockets arranged in the same but inverted relationship to the pockets in the base of the tray and a slot into which the base of the tray can be slid edgewise to bring the face of the tray base into juxtaposition with the face of the holder.

The dosimeters produced by the invention may be used to perform radiation dosimetry wherein the dosimeters are exposed to radiation after which the TL response of the dosimeter is read out. Accordingly, there is provided a dosimetry system comprising a dosimeter produced in accordance with the invention and a TLD reader for reading the TL response of the dosimeter.

The foregoing and other features of the invention are hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION

Figure 1:
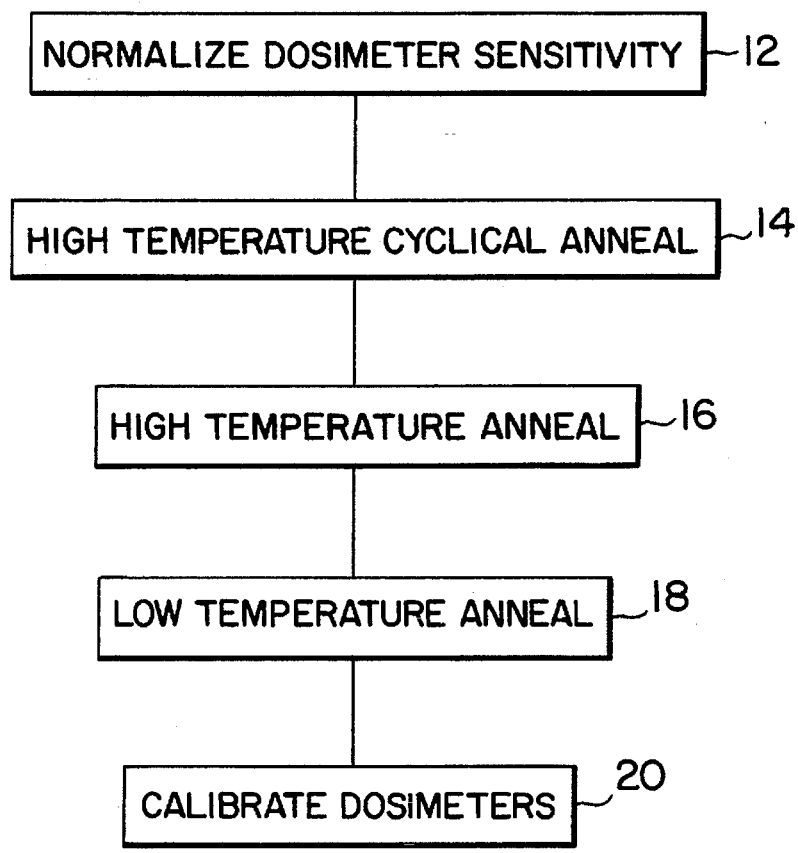
FIG. 1 is a flow chart diagram illustrating the several operational steps of a method for producing a dosimeter product in accordance with the invention.

As above summarized, the present invention provides a new dosimeter product that simplifies the process of dosimetry in medical diagnosis, therapy and other fields where high precision is needed. The dosimeter product is obtained by a unique training method which is diagrammatically illustrated by way of the flow chart of FIG. 1. The method has particular applicability to LiF and $CaF_2$ dosimeters and may be practiced with dosimeters in various forms including rods, chips, microcubes, etc. Although the invention may be applied to a single dosimeter, typically it will be applied to a group of dosimeters to which the element correction coefficients are related. All dosimeters in the group preferably should be from the same production batch to insure uniformity of response. The group of dosimeters, which may number 50 for example, should be maintained throughout the following procedures for optimum results.

Any required individual handling of the dosimeters preferably should be done with vacuum tweezers and less preferably with mechanical tweezers, but preferably not with fingers, to avoid scratches, loss of mass, and/or foreign deposits that may affect the light emission characteristics of the TL material. Preferably, before use, the dosimeters should be cleaned. LiF based and other dosimeters may be cleaned by rinsing with analytical grade anhydrous methyl alcohol and dried by evaporation for at least one hour.

Initially, the sensitivities of the dosimeters are normalized (block 12) by applying the well-known Harshaw "Magic Cycle". That is, the dosimeters preferably are annealed in a furnace at about 400° C. for about one hour and then quenched in air to about 80° C. for about two hours by placement on a brass plate or the like in an 80° C. oven. More generally, the anneal temperature may be between 200° C. and 600° C. and more preferably 300° C. and 500° C. The anneal period may also be varied usually in inverse relation to the temperature, the lower the temperature the longer the anneal period. The quench temperature may be between 50° C. and 150° C. and more preferably between 70° C. and 100° C. The quench period may also be varied usually in inverse relation to the temperature, the lower the temperature the longer the quench period.

After the sensitivities of the dosimeters have been normalized, the dosimeters are cyclically annealed at high temperature (block 14) to stabilize the sensitivity of each dosimeter so that its ECC will not change with time. It is important for optimum results that this annealing be done in a cyclical mode as opposed to simply annealing the dosimeters in a furnace for a fixed length of time. Each anneal cycle involves heating the dosimeter up to a cyclical anneal temperature, after which heating is stopped to allow the dosimeter to cool to a relaxation temperature before the next anneal cycle commences. This procedure is repeated for a number of cycles sufficient to stabilize the sensitivity of the dosimeter preferably to a precision factor of ±10%, more preferably ±3% and still more preferably ±1%.

Preferably, the anneal cycle closely matches the acquisition procedure that will be used by the end user to read the dosimeter, i.e., the procedure used to heat the dosimeter after irradiation to extract TL information. It is particularly beneficial that the cyclical anneal and relaxation temperatures be the same as the acquisition and preheat temperatures of the reader, respectively. For this reason, the cyclical anneal preferably is performed in a TLD reader ideally of the same type that will be used by the end user of the dosimeters, or alternatively in an apparatus that can duplicate the read cycle of the TLD reader.

Figure 2:
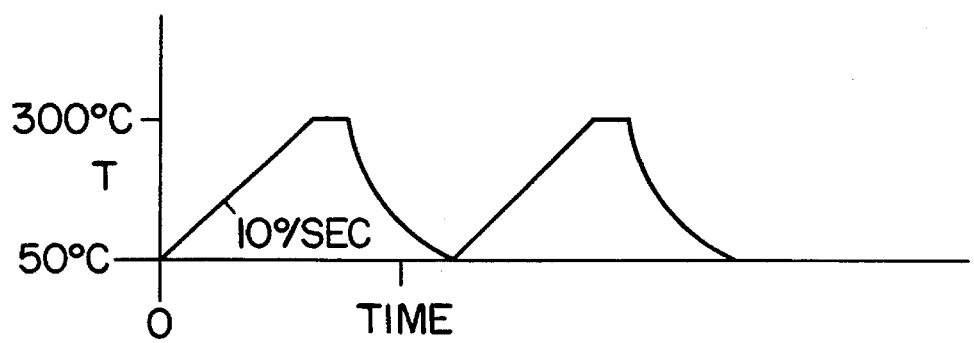
FIG. 2 is a graphical illustration of an exemplary cyclical anneal procedure used to train a dosimeter.

For LiF based dosimeters, and others as well, the heating rate preferably is set at about 10° C./second and cyclical anneal temperature is set at about 300° C. Accordingly, the temperature ramp-up time takes about 25 seconds starting with a typical preheat temperature of about 50° C. When the temperature reaches 300° C., heating is stopped and the dosimeter is allowed to cool for about 8 seconds which is sufficient time for the dosimeter to relax back to the preheat temperature of about 50° C. Accordingly, each cycle takes about 33 seconds. At least 10 anneal cycles are performed, and more preferably between 20 and 100 anneal cycles, with about 25 anneal cycles being a practical number of cycles that provide acceptable performance while minimizing the cyclical anneal time to about 14 minutes per dosimeter. A exemplary time-temperature graph of the cyclical anneal procedure is illustrated in FIG. 2.

More generally, the training regimen of the dosimeters is undertaken at preheat temperatures in the range of about 40° C. to about 150° C. and more preferably in the range of about 40° C. to about 80° C., and at heating rates ranging from about 1° C./second to about 1000° C./second and more preferably in the range of about 5° C./second to about 50° C./second. The dosimeters preferably are heated to a temperature in the range of about 180° C. to about 500° C. and more preferably in the range of about 250° C. to about 350° C. Between each heating the dosimeters preferably are allowed to cool to a relaxation temperature in the range of about 40° C. to about 150° C. and more preferably in the range of about 40° C. to about 80° C. The total cycle time will depend on the heating rate and the cyclical anneal and relaxation temperatures that are selected, although preferably the period of each cycle preferably is less than about 5 minutes and more preferably less than about 1 minute. As above indicated, at least 10 anneal cycles are performed, and more preferably between 20 and 100 anneal cycles, with about 25 anneal cycles being a practical number of cycles that provide acceptable performance while minimizing the cyclical anneal time.

After the sensitivity of the dosimeters is stabilized by the just described cyclical anneal procedure, the dosimeters may then be calibrated. If desired, the sensitivity stabilized dosimeters may be stored and later calibrated when needed, as calibration should be delayed until shortly before use. Although preferably calibrated in the following manner, the dosimeters may be used in applications where there is a need for dosimeters having stabilized sensitivity that will yield a predictable response on next reading.

At such time that the dosimeters are to be calibrated, they are prepared for calibration by a high temperature anneal (block 16) to assure that all residual TL signal is removed. This pre-calibration high temperature anneal involves a single anneal procedure closely matching and preferably the same as the procedure to be used to read the dosimeter after irradiation. Preferred time-temperature profile parameters for a Harshaw/Bicron Model 5500 TLD reader are set forth in Table 1, although those skilled in the art will appreciate that other readers may be used.

TABLE 1

Default TTP Parameters

| Parameter | TTP Number | | | | | |
|---|---|---|---|---|---|---|
| | LiF Rods (HD) | LiF Rods (LD) | LiF .035" Chips and Cubes (HD) | LiF Chips (LD) | LiF .015" Chips (HD) | LiF Cubes (LD) |
| Preheat Temp (°C.) | 50 | 65 | 50 | 50 | 50 | 50 |
| Preheat Time (sec.) | 0 | 0 | 0 | 0 | 0 | 0 |
| Acquire Rate (°C./sec.) | 10 | 12 | 15 | 15 | 15 | 15 |
| Acquire Temp (°C.) | 300 | 300 | 350 | 300 | 325 | 300 |
| Acquire Time (sec.) | 33+ ⅓ | 20 | 26 + ⅔ | 20 | 23+ ⅓ | 23+ ⅓ |
| Anneal Temp (°C.) | 300 | 300 | 350 | 300 | 325 | 300 |
| Anneal Temp (sec.) | 0 | 0 | 0 | 0 | 0 | 0 |
| Gain Setting | High | High | High | High | High | High |

If desired, these same parameters may be used for the cyclical anneal. As will be appreciated, this pre-calibration high temperature anneal may be omitted if the dosimeters are being calibrated immediately after the cyclical anneal.

The dosimeters are next prepared for calibration exposure by a long term, low temperature anneal (block 18) to eliminate the fade components of the TL signal. The dosimeters are annealed in an oven preferably at about 80° C. for about seventeen hours, after which the dosimeters are removed from the oven and cooled at a controlled rate to room temperature. More generally, the anneal temperature may be between about 80° C. and 150° C. The anneal period may also be varied usually in inverse relation to the temperature, the lower the temperature the longer the anneal period.

Figure 3:
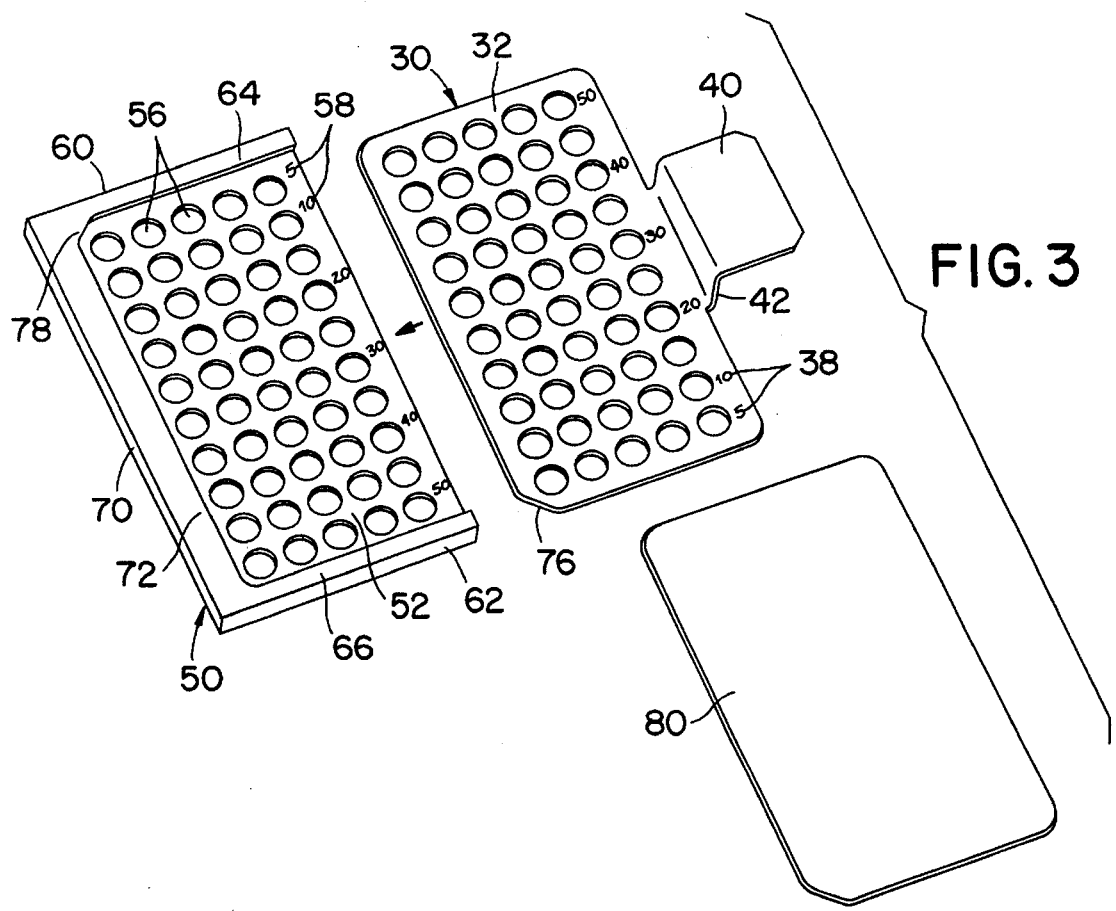
FIG. 3 is an isometric view of an annealing tray, holder and cover according to the invention.

FIG. 3 shows a preferred embodiment of an annealing tray that is useful in performing the pre-calibration low temperature anneal (and which may also be used to perform the above described high temperature normalizing anneal). The annealing tray, designated generally by reference numeral 30, preferably is made from high temperature stainless steel (or other suitable metal such as oxidized aluminum) and has a base 32 that has a planar face including a plurality of pockets 36 that are identified by indicia 38. As shown, there are 50 numbered pockets for accommodating up to 50 dosimeters. In the illustrated embodiment the pockets can handle dosimeters ranging from 1 $mm^3$ up to 4.5 mm in size. More particularly the pockets have a depth of about 0.060 inches and a diameter of about 0.281 inches. The tray also has a metal handle 40 projecting from one side of the base 32 to facilitate removal from an oven with pliers, tongs, etc. The handle preferably is bent, as shown at 42, to offset the gripping end thereof above the plane of the base so that the gripping end will be spaced above the surface on which the tray is supported in the oven.

As shown in FIG. 3, the annealing tray has associated therewith a holder 50. The holder, which may be made of a phenolic, has a base 52 that has a planar face including a plurality of pockets 56 that are identified by indicia 58. The pockets 56 and indicia 58 are arranged in the same but inverted relationship to the pockets 36 and indicia 38 in the base of the annealing tray, whereby pockets in the holder base will be aligned with correspondingly identified pockets in the tray base when the planar faces 54 and 34 of the holder and base are juxtaposed. Preferably, the holder includes at opposite ends thereof opposed end walls 60 and 62 that have inturned lips 64 and 66 spaced from the planar face to form a slot into which the base of the annealing tray may be slid edgewise to bring the planar face thereof into juxtaposition with the planar face of the holder. The slot has one end thereof closed by a side wall 70 extending between the end walls 60 and 62, which side wall may also have an inturned lip 72 forming a continuation of the inturned lips 64 and 66 of the end walls. Preferably a key is provided to prevent incorrect insertion of the tray into the holder. In the illustrated embodiment this key is formed by a chamfer 76 at one corner of the annealing tray and a key element 78 at the corresponding corner of the holder which will interfere with the nonchamfered corner of the tray if the tray is inserted upside down.

After the annealing tray has been removed from the oven and cooled to room temperature, the dosimeters may be easily transferred to the holder by slipping the holder over the annealing tray with the tray being inserted into the slot in the holder. The assembled tray and holder are then inverted to transfer the dosimeters from the pockets in the tray to correspondingly identified pockets in the holder. The tray is then removed from the holder and replaced by a cover 80 which may be slid into the slot of the holder. The cover overlies the pockets 56 in the holder to hold the dosimeters in the pockets. The cover may be made of a clear UV opaque polycarbonate and slides over the top of the holder base 52 for safe storage.

In the foregoing manner, the dosimeters can be transferred from the annealing tray 30 to the holder 50 without having to individually handle the dosimeters. This frees the annealing tray for use with a next group of dosimeters. Moreover, the tray and holder are correspondingly numbered to preserve the dosimeter identification.

Figure 4:
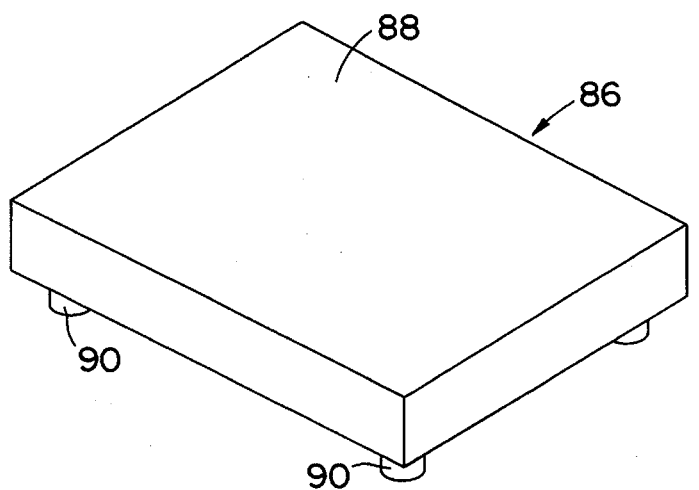
FIG. 4 is an isometric view of a chill block according to the invention.

For the low temperature anneal the dosimeters are placed in the pockets of the annealing tray and then the tray with the dosimeters is placed in an oven preheated to 80° C. After the prescribed anneal period, preferably 17 hours, the annealing tray is removed from the oven with a pair of pliers and immediately placed onto a metal heat sink at room temperature. A preferred heat sink is a quench block shown in FIG. 4 which provides a consistent cooling rate for all dosimeters after annealing. The quench block 86 includes a block 88 of black anodized aluminum (or other suitable material such as brass) having a planar top surface onto which the annealing tray is placed for quenching. The illustrated quench block, which is 6.0 inches long, 4.5 inches wide and 1.0 inch thick, has at the corners thereof respective feet 90 made of a non-skid insulating material such as rubber.

After the low temperature anneal, the dosimeters are calibrated (block 20, FIG. 1) by first exposing them to high energy photons or betas to a prescribed dose of radiation by using, for example, a Harshaw/Bicron Model 2000DI Sr-90 irradiator.

After exposure the dosimeters are read to obtain the dosimeters' responses to the irradiation. The dosimeters may be read, for example, in a Harshaw/Bicron Model 5500 automated TL reader following the normal procedures described in Publication No. 5500-0-U, Section 4.0 (hereby incorporated herein by reference) using the conditions set forth in Table 1. After the dosimeters have been read, the dosimeters are then calibrated in conventional manner by generating element correction coefficients for every dosimeter in the group ($ECC_i$ =Average TL Response of the group of dosimeters/TL Response of dosimeter i). The group element correction coefficients (ECCs) compensate for the differences in sensitivity among the group of the dosimeters, bringing the sensitivity of each dosimeter to the sensitivity of the mean of the population. Any dosimeters that fall outside of an acceptable ECC range (such as ±3%) may be removed from the group. The dosimeters may be subjected to a further low temperature anneal similar to the above described low temperature anneal, or even in place thereof, to remove low temperature peaks (peaks 1–3 of LiF).

The result of the foregoing method is a group of precalibrated dosimeters with stable sensitivity that are ready to use with established correction factors for individual TL response differences. This eliminates, among other things, the need for the end user to track individual dosimeters and to maintain annealing furnaces and fixtures, the need for the end user to use fading adjustment procedures, and the need for the end user to sort and match dosimeters for response averaging, . The end user exposes the dosimeters, reads the dosimeters in a TL reader, and applies the appropriate correction factors to provide a measure of radiation exposure. The dosimeters may then be discarded or re-processed in the foregoing manner for another use. The foregoing methodology is capable of yielding dosimeters having a precision of greater than ±10%, even greater than ±3% and still even greater than ±1%.

The read procedure is generally dictated by the particular reader used. The procedure prescribed for the reader generally may be followed except that the ECCs supplied with the dosimeter are used instead of the user having to generate the ECCs.

Figure 5:
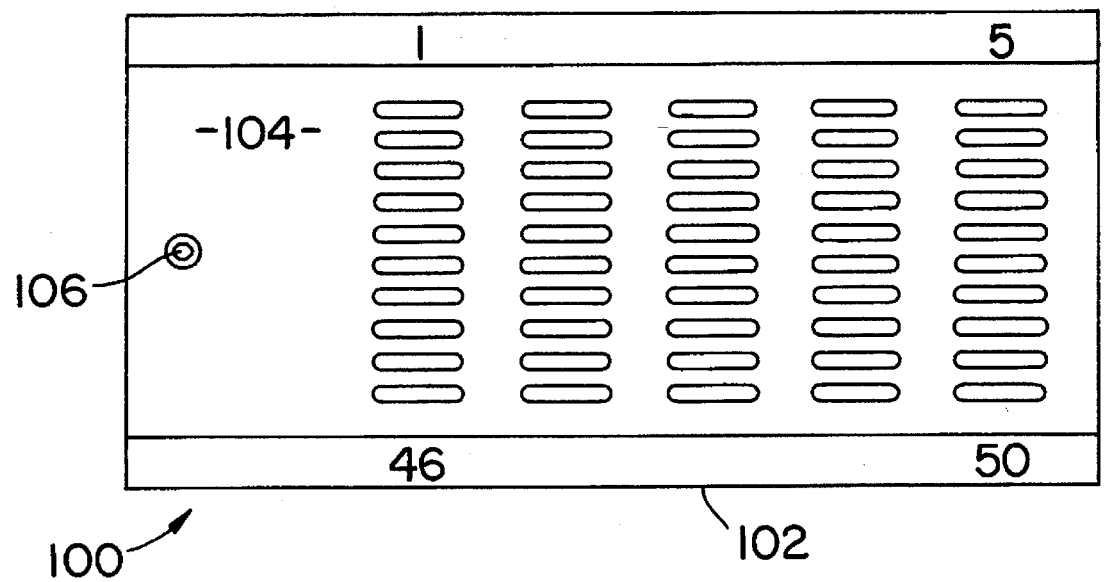
FIG. 5 is a plan view of a storage case.
Figure 6:
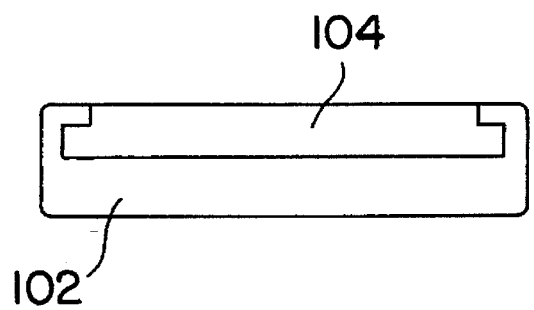
FIG. 6 is an end view of the storage case of FIG. 5.

FIGS. 5 and 6 shows a storage case 100 in which the dosimeters may be supplied to the end user. The storage case in a compact case designed for storing and transporting dosimeters in a protected environment. The storage case includes a base 102 made of black polycarbonate with grooved and numbered pockets for holding up to 50 dosimeters. The pockets are preferably configured to closely accommodate the particular form of dosimeter to be stored, such as rods, chips, discs and microcubes. The base is slotted for slide in receipt of a cover 104 made of clear polycarbonate that is opaque to ultraviolet light and protects the dosimeters. The cover and base are provided with an interlocking mechanism such as a cooperating ball and detent mechanism 106 which maintains the cover in place in the base.

The characteristics of newly introduced, factory calibrated dosimeters have been investigated by studying the consistency of the element correction coefficients (ECCs) under a variety of conditions. The ECC ($<x>/x_i$) relates an individual dosimeter's response, $x_i$, to the mean response, $<x>$, of the group. The relative standard deviation of five TLD's exposed to various doses in the range of 50 cGy to 900 cGy, with ECC's applied using a 1 cGy dose, yielded results under 2%. At Orthovoltage energies ranging from 100 kVp to 300 kVp, the corresponding relative standard deviations were less than 3%.

A LiF dosimeter according to the invention is further characterized by a repeatability of ±1% to 3 σ and has essentially no low temperature peaks (peaks 1–3). Also, two dosimeters from the same batch would have sensitivities within 3% prior to application of the EECs and within 1% after application of the ECCs.

The calibrated dosimeters may be used in a wide variety of applications including radiotherapy (blood irradiation, brachytherapy, stereotactic surgery, critical organ dose measurements, dynamic wedge profiling, low energy orthovoltage, superficial malignancies treatment and research), diagnostics (mammography, CT and X-ray imaging, fluoroscopy, catherization and research), beam characterization and quality assurance (initial acceptance, periodic checks, validation of theoretical computation, beam profiling, dose mapping and research), radioactive waste monitoring (contamination and source activity) and radiation protection (whole body, extremity and environmental). The dosimeters may be used in these applications generally in conventional manner, but with advantage being gained by the dosimeters having a stabilized sensitivity which provides greater precision and eliminates previously used procedures to adjust for sensitivity variation.

Although the invention has been shown and described with respect to a preferred embodiment, it will be apparent that equivalent alterations and modifications will occur to others skilled in the art upon the reading and understanding of this specification. The present invention includes all such equivalent alterations and modifications, and is limited only by the scope of the following claims.

What is claimed is:

1. A method of stabilizing the sensitivity of a thermoluminescent dosimeter comprising the step of cyclically annealing the dosimeter by repeatedly annealing the dosimeter for at least ten cycles, while allowing the dosimeter to cool after each anneal and without any irradiation of the dosimeter between anneal cycles, thereby to stabilize the sensitivity of the dosimeter.

2. A method as set forth in claim 1, wherein each anneal cycle of said cyclically annealing step includes heating the dosimeter to an upper temperature, after which heating stops and the dosimeter is allowed to cool to a lower temperature before the next anneal cycle starts.

3. A method as set forth in claim 2, wherein said dosimeter is heated to said upper temperature at a rate of at least about 1° C./second, said upper temperature is at least about 180° C., and said lower temperature is no greater than about 150° C.

4. A method as set forth in claim 2, wherein said dosimeter is heated to said upper temperature at a rate of at least 10° C./second ±2° C., said upper temperature is 300° C. ±50° C., and said lower temperature is in the range of 40° C. to 100° C.

5. A method as set forth in claim 1, wherein each anneal cycle of said cyclically annealing step has a period of less than 10 minutes.

6. A method as set forth in claim 1, wherein each anneal cycle of said cyclically annealing step has a period of less than 1 minute.

7. A method as set forth in claim 1, wherein the cycles of said cyclically annealing step have a period, and further including the step of normalizing the sensitivity of the dosimeter prior to said cyclically annealing step by annealing the dosimeter for a period of time greater than the period of the cyclical anneal cycles.

8. A method as set forth in claim 7, wherein said normalizing step includes annealing the dosimeter at a constant temperature of at least about 200° C. for a period of at least about 1 hour.

9. A method as set forth in claim 7, wherein said normalizing step includes annealing the dosimeter at a constant temperature of about 400° C. ±25° C. for a period of at least about 1 hour.

10. A method as set forth in claim 7, wherein said normalizing step includes quenching the dosimeter to a temperature no greater than 150° C.

11. A method as set forth in claim 10, further including the step of low temperature annealing the dosimeter at a temperature in the range of 50° C. to 150° C. after said cyclically annealing step.

12. A method as set forth in claim 11, further including the step of calibrating a group of the dosimeters after said low temperature annealing step and generating element correction coefficients for the dosimeters in the group thereof.

13. A group of dosimeters processed in accordance with the method of claim 12.

14. A dosimeter processed in accordance with the method of claim 1.

15. A method as set forth in claim 1, wherein the dosimeter is repeatedly annealed for about 25 cycles, while allowing the dosimeter to cool after each anneal and without irradiation of the dosimeter between anneal cycles.

16. A method for performing radiation dosimetry, comprising the step of exposing to radiation the dosimeter of claim 1, and then reading the a TL response of the dosimeter.

17. A dosimetry system comprising a dosimeter made according to the method of claim 1, and a TLD reader for reading a TL response of the dosimeter.

18. A method of producing a thermoluminescent dosimeter having high sensitivity stability and low fade comprising the steps of:

(a) training the dosimeter to stabilize the sensitivity of the dosimeter, and (b) then annealing the dosimeter at a temperature in the range of 50° C. to 150° C. for a period of at least about 2 hours.

19. A method as set forth in claim 15, wherein step (a) includes repeatedly annealing the dosimeter for at least 10 cycles having a period less than the anneal period of step (b), while allowing the dosimeter to cool after each anneal and without any irradiation of the dosimeter between anneal cycles, thereby to stabilize the sensitivity of the dosimeter.

20. A method as set forth in claim 19, including the further step of (c) calibrating a group of the dosimeters after step (b) and generating element correction coefficients for the dosimeters in the group thereof.

21. A dosimeter processed in accordance with the method of claim 18.

22. An annealing tray and holder assembly comprising an annealing tray having a base having a face containing a plurality of pockets for containing a dosimeter, and a holder, said holder including a base having a face containing a plurality of pockets arranged in the same but inverted relationship to the pockets in the base of said tray and a slot into which the base of said tray can be slid edgewise to bring the face of the tray base into juxtaposition with the face of the holder.

* * * * *